United States Patent [19]

Stoka et al.

[11] Patent Number: 4,494,630
[45] Date of Patent: Jan. 22, 1985

[54] FLOATING-CALIPER SPOT-TYPE DISC BRAKE

[75] Inventors: Roberto Stoka, Nauheim; Lucas H. Haar, Niddatal, both of Fed. Rep. of Germany

[73] Assignee: ITT Industries, Inc., New York, N.Y.

[21] Appl. No.: 517,992

[22] Filed: Jul. 29, 1983

Related U.S. Application Data

[63] Continuation of Ser. No. 269,938, Jun. 3, 1981, abandoned.

[30] Foreign Application Priority Data

Jul. 16, 1980 [DE] Fed. Rep. of Germany ....... 3026817

[51] Int. Cl.³ ............................................. F16D 65/20
[52] U.S. Cl. .................................. 188/71.8; 188/72.3; 188/72.5; 188/196 R; 188/264 G; 188/370
[58] Field of Search .................... 188/72.5, 72.4, 370, 188/364, 369, 368, 106 P, 106 R, 72.3, 72.2, 71.1, 73.1, 264 G, 71.8, 345, 196, 71.3, 73.43, 73.44, 73.45, 250 B, 106 A, 216; 192/111 A

[56] References Cited

U.S. PATENT DOCUMENTS

| 2,517,973 | 8/1950 | Caldwell et al. | 188/264 G |
| 2,754,936 | 7/1956 | Butler | 188/72.5 |
| 2,922,495 | 1/1960 | Griswold | 188/264 G |
| 3,255,846 | 6/1966 | Livezey | 188/72.3 X |
| 3,448,835 | 6/1969 | Inada | 188/345 |
| 3,470,984 | 10/1969 | Goddard | 188/72.5 |
| 3,654,689 | 4/1972 | Schwarz | 188/72.5 X |
| 3,675,743 | 7/1972 | Thompson | 188/370 X |
| 3,772,940 | 11/1973 | Ohtsuka et al. | 188/72.5 X |
| 3,791,492 | 2/1974 | Neilson | 188/72.5 X |
| 3,995,723 | 12/1976 | Holcomb, Jr. | 188/370 X |
| 4,058,084 | 11/1977 | Kawaguchi et al. | 188/196 P X |
| 4,093,043 | 6/1978 | Smith | 188/72.5 X |
| 4,163,483 | 8/1979 | Baba et al. | 188/196 P X |

FOREIGN PATENT DOCUMENTS

| 1480356 | 10/1969 | Fed. Rep. of Germany | 188/72.5 |
| 2213162 | 9/1972 | Fed. Rep. of Germany | 188/370 |
| 2231915 | 1/1973 | Fed. Rep. of Germany | 188/72.5 |
| 2258116 | 6/1974 | Fed. Rep. of Germany . | |
| 1090611 | 4/1955 | France | 188/370 |
| 871308 | 6/1961 | United Kingdom | 188/72.5 |
| 1070311 | 6/1967 | United Kingdom | 188/345 |
| 1084410 | 9/1967 | United Kingdom | 188/345 |

Primary Examiner—Douglas C. Butler
Attorney, Agent, or Firm—James B. Raden; Edward J. Brosius

[57] ABSTRACT

In floating-caliper disc brakes, the friction in the caliper guides hinder movement of the caliper in the brake release direction, thus, increasing the drag of the brake when it is not operated. According to the present invention, the reaction portion of the caliper is provided with an applying piston of small axial length whose axial movement is limited to an amount equal to the required brake clearance. The applying piston is spring biased in the release direction, thus, producing the brake clearance without movement of the caliper.

18 Claims, 6 Drawing Figures

FLOATING-CALIPER SPOT-TYPE DISC BRAKE

CROSS REFERENCE TO RELATED APPLICATION

This application is a continuation of application Ser. No. 269,938, filed June 3, 1981, now abandoned.

BACKGROUND OF THE INVENTION

The present invention relates to a floating-caliper spot-type disc brake including a caliper which is axially slidably guided on a brake support member, the caliper having on one side of the brake disc a hydraulic brake-actuating device incorporating a mechanism for adjustment of the brake clearance between the brake disc and friction pads of the brake shoes.

Floating-caliper spot-type disc brakes embrace the brake disc in a U-shape. However, on only one side of the brake disc is the floating caliper equipped with a hydraulically movable brake-actuating device which axially displaces the brake pad on this side of the brake disc. The brake pad on the opposite side of the brake disc is moved indirectly by the floating caliper, which bears via the cylinder housing against the piston or directly against a second piston located in the cylinder housing. After the brake pad close to the piston has been applied to the disc, the reaction force will move the second brake pad until it abuts the disc by displacing the caliper and enables the braking action. Upon termination of the braking action, the required clearance will be adjusted on the piston side by the resetting of the piston, for instance, by means of an elastically deformed sealing ring.

Movement of the floating frame or fist-type caliper in its guides, predominantly on account of the blows exerted by the disc, will under normal conditions provide the adjustment of a brake clearance even for the brake pad close to the frame, or in other words, the outboard reaction, or indirectly actuated brake pad. However, if the guides for the caliper do not allow ease of movement, there occur known disadvantages, such as squeaking, grinding and uneven pad wear.

An adjustment of the clearance for the outboard brake pad or brake pad close to the frame of a floating-frame disc brake is known from German Patent DE-AS No. 2,258,116, which adjustment is accomplished mechanically by means of a holding and guiding spring arranged between brake support member and brake frame. A resetting movement of the frame and the brake pad abutting thereon is provided by the holding and guiding spring being supported on at least one sloped ramp of the brake support member inclined in the direction of the brake disc which produces a force component pointing axially to the disc, so that the frame will be moved in the direction axially away from the disc by the additional assistance of the spring effect created by the cross-leaf spring and of blows exerted by the disc. This contributes to achieve a clearance at the brake pad close to the frame.

However, there is the difficulty in these devices to correctly match the spring force and the angle of inclination. Though these two values are properly selected when the brake is new, there may occur considerable discrepancies as to the amount of force required for displacement of the floating caliper in the event of contamination and corrosion of the floating caliper guides as the brake is used. Under these circumstances, the resetting of the frame will no longer be guaranteed, and the above-referenced disadvantages will appear.

SUMMARY OF THE INVENTION

It is, therefore, an object of the present invention to provide a floating-caliper brake which guarantees a reproducible adjustment of the clearance required between the brake pads and the brake disc on both sides of the brake disc in a reliable manner, even under impeded operating conditions, such as, for example, contamination or corrosion of the guiding surfaces, and which ensures an even pad wear.

A feature of the present invention is the provision of a floating-caliper spot-type disc brake comprising: a caliper axially slidably guided on a support member, the caliper embracing a brake disc having a hydraulic brake-actuating device disposed therein on one side of the disc operating directly on an adjacent one of two brake shoes each disposed on a different side of the disc, the caliper operating on the other of the two brake shoes indirectly by means of a reaction, the brake actuating device incorporating a first mechanism for providing a predetermined brake clearance between the one of the two brake shoes and the adjacent side of the disc upon termination of a braking operation; and a hydraulic applying device disposed in the caliper on the other side of the disc operating on the other of the two brake shoes, the applying device being in communication with the brake-actuating device via a line in the caliper, having an effective hydraulic surface equal to that of the brake-actuating device and providing a second mechanism to provide the predetermined clearance between the other of the two brake shoes and the adjacent side of the disc upon termination of the braking operation, the applying device having a power stroke limited to the predetermined clearance.

If the brake-actuating device and hydraulic applying device are formed by hydraulically movable pistons and the clearance is adjusted by the resilient moving back of the sealing ring, there will be obtained, due to the like piston diameters, a non-complicated construction and with respect to manufacturing technique favorable construction in which identical components will be utilized.

Employment of an elastically deformable diaphragm of metal as the hydraulic applying device will result in a simplification of manufacture, in that case, in which the diaphragm is, on account of a plastic deformation of the caliper's material, held in a hydraulically sealed relationship in the caliper.

The advantageous adjustment of the clearance according to the present invention with the brake shoes being connected to the pistons will be accomplished in that the amount of the axial forces for the releasing movement of the pistons is smaller than the amount of force required for the displacement of the caliper.

If the cylindrical housing of the hydraulic applying device is of a construction which allows being manufactured separately and then connected to the caliper, an arrangement will result which is favorable from the point of manufacturing technique. Compared thereto, the number of components will be smaller, if the piston is arranged in the caliper.

The power stroke of the brake-actuating piston will be limited in a simple manner by means of a stop, preferably in the form of a circlip. The power stroke of the hydraulic applying device is able to be limited in a likewise simple manner by means of stops formed at the caliper for the pad carrier plate.

In case the clearance is achieved by means of springs arranged between piston or brake shoe and caliper, the double function of the sealing ring will be reduced to the sealing action itself, and the sealing ring is permitted to be constructed or arranged differently. A particularly low-cost spring arrangement results when a cup spring is provided between the piston and the stop.

A small overall axial length of the hydraulic applying device is accomplished since the piston is only slightly longer than the axial thickness of the sealing ring plus clearance.

If the sealing ring is constructed and arranged so as to engage in circumferential grooves lying opposite each other in the piston periphery and in the cylinder bore, the sealing ring will also form the axial stop for limiting the stroke.

A device requiring the machining of only a small number of surfaces will be obtained by inserting a diaphragm made of rubber-like material into a groove of the cylinder bore. If necessary, a heat-insulating element will be provided to prevent an unwelcome heat transfer between diaphragm and brake shoe.

An undesirable deformation of the diaphragm is avoided by arranging for the collar of a ring to abut at the pad carrier plate of the heat-insulating element and by arranging for the annular portion to extend into the cylinder bore and to thereby embrace the diaphragm completely.

Since the ring is of L-shaped profile, it permits being manufactured at low cost by noncutting shaping of a punched-out sheet-metal component.

The essential advantage the present invention is the safety obtainable with respect to the adjustment of a sufficient clearance for both brake shoes independently of the slidability of the caliper.

The adjustment of the clearance will be ensured on both sides by the resilient moving back of the sealing rings or by spring elements. Consequently, the total clearance resulting therefrom will be greater than the total clearance which is achievable by one piston alone when adjusting the clearance. In contrast to the advantage of a constant, sufficient clearance for both brake shoes according to the present invention is the previous disadvantage of the uneven distribution of the altogether smaller clearance onto both brake shoes. The constant and reliable clearance adjustment of the present invention prevents the uneven pad wear and, thus, permits longer time intervals between pad replacement as well.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
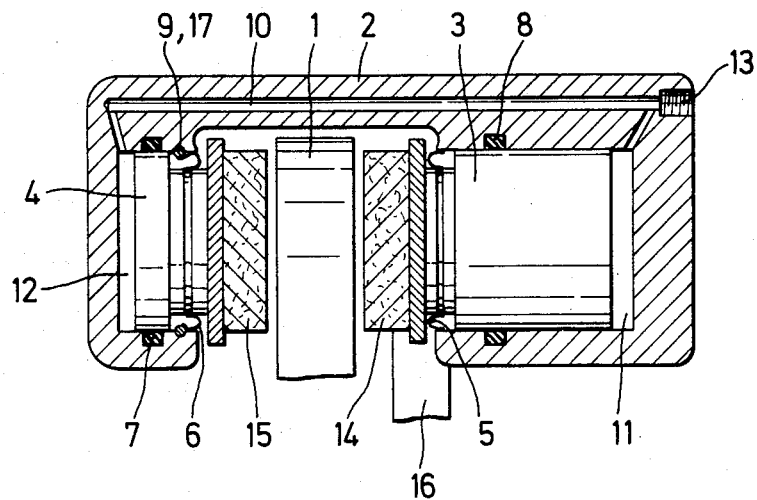
FIG. 1 is a longitudinal cross sectional view of a floating-caliper spot-type disc brake including a first embodiment of an applying device in accordance with the principles of the present invention.

Referring to FIG. 1, the floating-caliper spot-type disc brake includes a caliper 2 accommodating two pistons 3 and 4 in its housing which embraces the brake disc 1 in a U-shape. The longer piston in an axial direction is piston 3 of the actuating device and piston 4 of the applying device lies opposite to piston 3 on the other side of brake disc 1. Pistons 3 and 4 include dust boots 5 and 6 and sealing rings 8 and 7, respectively, which also serve, when expediently constructed as resilient elements, to reset pistons 3 and 4. A securing element for limiting the axial travel of piston 4, for instance, a circlip 9, is inserted in the cylindrical bore containing piston 4 in such a manner that the admissible axial travel of piston 4 of the applying device corresponds to the defined clearance. The overall axial length of piston 4 is slightly longer than the axial thickness of sealing ring 7 plus the defined clearance. A connecting line 10 provides for communication of the pressure chamber 11 of piston 3 with the pressure chamber 12 of the applying device. An inlet port 13 connects pressure chamber 11 to the hydraulic brake system. Further, brake shoes 14 and 15 are arranged in front of pistons 3 and 4, respectively.

When piston 3 is pressurized, it will first urge the associate brake shoe 14 into abutment with disc 1. At the same time, piston 4 will displace by said pressure up to the stop at circlip 9 in caliper 2 and will thus also move brake shoe 15 by an amount equal to the axial travel of piston 4 toward disc 1.

If the pressure build-up takes place for the first time after a brake pad replacement, for example, brake shoe 14 will finally be in abutment with disc 1, but brake shoe 15 is allowed to be spaced therefrom. In a known manner, the reaction force between piston 3 and caliper 2 will then cause displacement of caliper 2 in relation to brake support member 16, until brake shoe 15, too, is in abutment with disc 1 and the braking action may commence.

Upon termination of the braking action, the elastically deformed sealing rings 7 and 8 will, due to the pressure, decrease reset piston 3 and piston 4 by a predetermined amount which is defined as the brake clearance. Thereby, a defined brake clearance is accomplished on both sides of disc 1 without causing movement of caliper 2 relative to brake support member 16.

When a braking action is commenced anew, caliper 2 will no longer move relative to brake support member 16. Pad wear at brake shoe 14 will be compensated for at piston 3 by the latter moving out of its cylindrical bore. As to brake shoe 15, pad wear compensation is carried out by displacement of caliper 2 relative to brake support member 16.

Figure 2:
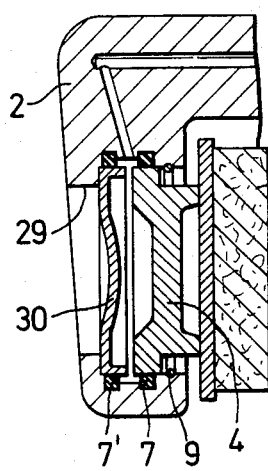
FIG. 2 is a longitudinal cross sectional view of a second embodiment of an applying device in accordance with the principles of the present invention that can be employed in the brake of FIG. 1.

Referring to FIG. 2, a second embodiment of the applying device, replacing piston 4 of FIG. 1 includes a bore 29 in caliper 2 which facilitates the machining operation and which is closed by a sheet-metal cover 30 and a sealing ring 7'. Placed a small axial distance from cover 30 in direction of brake shoe 15 is the sealing ring 7 which seals piston 4 and effects the adjustment of the brake clearance. The stroke of piston 4 is limited by circlip 9. The details of the arrangement may be clearly seen in FIG. 3.

Figure 3:
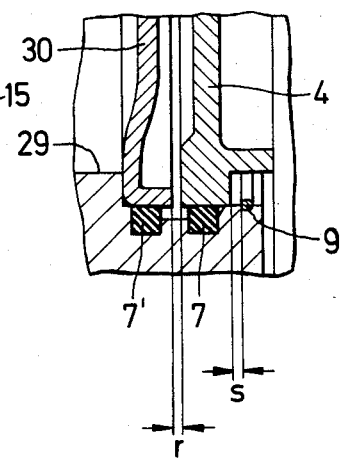
FIG. 3 illustrates details of the applying device of FIG. 2.
Figure 4:
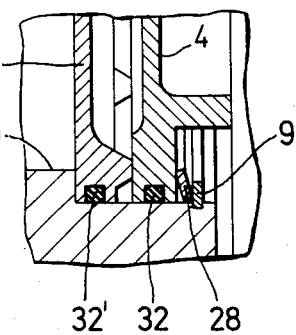
FIG. 4 illustrates details of a third embodiment of an applying device in accordance with the principles of the present invention.

FIG. 4 shows the details of a modified arrangement of FIGS. 2 and 3 in which the sealing rings 7 and 7' are replaced by O-rings 32 and 32' inserted in piston 4 and cover 31 instead of in the cylindrical housing. O-ring 32 does not have a spring or resilient function at its counterpart in FIGS. 2 and 3 in the form of sealing ring 7. This resilient function is provided by cup spring 28. Cup spring 28 is disposed between piston 4 and stop 9 to provide the returning of piston 4 to establish the required brake clearance.

Figure 5:
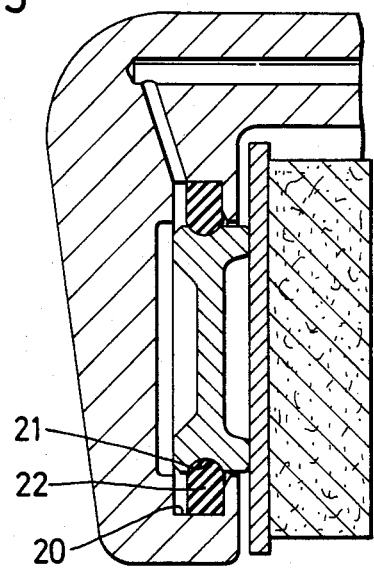
FIGS. 5 and 6 are longitudinal cross sectional views of further embodiments of applying devices in accordance with the principles of the present invention.

FIG. 5 shows a further embodiment of the applying device, in which the larger portion of a sealing ring 22 is placed in a groove 20 of the cylinder bore and a smaller portion of semi-circular shape in a corresponding groove 21 in piston 4. After being mounted, sealing ring 22 is biased against the groove bottom of grooves 20 and 21. Groove 20 is wider than sealing ring 22 to enable the semicircular portion of sealing ring 22 to be fitted into groove 21 when the piston is inserted. In addition, sealing ring 22 and a side wall of groove 20 cooperate to limit the stroke of piston 4 in the direction of disc 1 to the required brake clearance.

Machining a cylinder bore for the piston 4 of the applying device and providing the mechanism for adjustment of the brake clearance may be dispensed with by a non-illustrated embodiment employing a metallic diaphragm as the applying device which causes the resetting as well.

Figure 6:
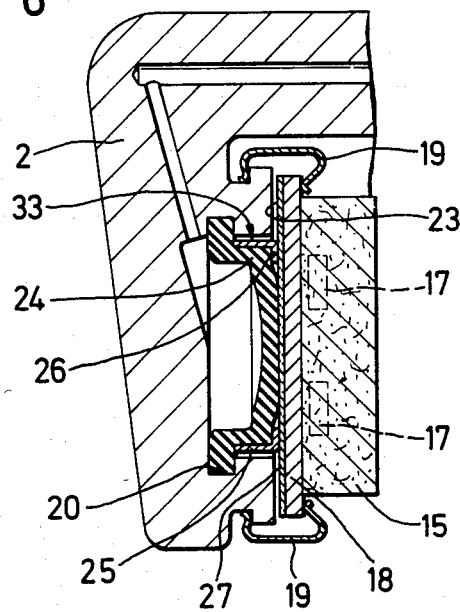

FIG. 6 shows another embodiment of an applying device in which a diaphragm 24, made of rubber, for instance, is placed in a groove 20 of the unmachined cylindrical bore and closes the latter in a hydraulically sealed relationship. Diaphragm 24 acts on the back side 23 of pad carrier plate 18, with back side 23 being formed by a layer of a heat-insulating element 27, for example. An excessive expansion of diaphragm 24 is prevented by stops 17 for pad carrier plate 18, which are formed in caliper 2 and limit the actuating stroke to the brake clearance. A ring 25 completely encompassing diaphragm 24 is arranged between the latter and back side 23 so that the annular portion 33 is inserted with play in the cylindrical bore and the collar 26 is located between the end face of diaphragm 24 and back side 23 of pad carrier plate 18. Ring 25 is able to be both fitted loosely in the cylindrical bore and connected rigidly with brake shoe 15. In the event of full braking pressure, collar 26 prevents diaphragm material to squeeze in the gap which is present between caliper 2 and pad carrier plate 18 when brake shoe 15 is applied to disc 1. The resetting of brake shoe 15 and thus the adjustment of the brake clearance is achieved by springs 19 which bear against caliper 2 and carrier plate 18 biasing them relative to one another.

In FIG. 3, the required clearance is designated by the letter s. When subjected to pressure, piston 4 will move this amount of travel by elastically deforming sealing ring 7. When the pressure decreases, piston 4 will be set back by the spring action due to the elasticity of sealing ring 7 by this amount s. Designated by the letter r is play that enables absorbing a blow of disc 1 without displacement of caliper 2. The construction where sealing ring 7 is embraced only partially by the groove enables sealing ring 7 to be axially elastically deformed in the direction of sheet-metal cover 30 by piston 4 moving on account of a disc blow. The initial position will be reestablished by the resilient backward movement of sealing ring 7.

While we have described above the principles of our invention in connection with specific apparatus it is to be clearly understood that this description is made only by way of example and not as a limitation to the scope of our invention as set forth in the objects thereof and in the accompanying claims.

We claim:

1. A floating-caliper spot-type disc brake comprising:
a caliper displaceable relative to a support member, said caliper embracing a brake disc having a hydraulic brake-actuating device disposed therein on one side of said disc operating directly on an adjacent one of two brake shoes each disposed on a different side of said disc, said caliper operating on the other of said two brake shoes indirectly by means of a reaction, said brake actuating device incorporating a first hydraulically movable piston and a first mechanism in contact with said caliper and said first piston for providing a predetermined brake clearance between said one of said two brake shoes and the adjacent side of said disc upon termination of a braking operation, wear of said one of said two brake shoes being compensated for by said first piston moving toward said disc; and
a hydraulic applying device disposed in said caliper on the other side of said disc operating on the other of said two brake shoes, said applying device being in constant communication with said brake-actuating device via a line in said caliper coupled to a common brake circuit input, said applying device having an effective hydraulic surface equal to that of said brake-actuating device, having a hydraulic movable means and having a second stop mechanism in contact with said caliper and a selected one of said hydraulically movable means and said other of said two brake shoes to limit movement of said other of said two brake shoes to provide said predetermined clearance between said other of said two brake shoes and the adjacent side of said disc upon termination of said braking operation, said applying device having a power stroke limited to said predetermined clearance and said reaction compensating for wear of said other of said two brake shoes.

2. A brake according to claim 1, wherein
said applying device includes a second hydraulically movable piston, and
each of said first and second mechanisms includes a resilient sealing ring disposed in sealed relationship between an outer peripheral surface of an associated one of said pistons and an inner surface of an associated cylindrical bore in said caliper for said pistons and to resiliently move its associated one of said pistons back after said braking operation to provide said predetermined clearance.

3. A brake according to claim 2, wherein
axial forces to be overcome by said sealing rings to move their associated one of said pistons and to provide said predetermined clearance after said braking operation is smaller than forces required to displace said caliper relative to said support member.

4. A brake according to claims 1 or 2, wherein
axial movement of said movable means toward said disc is limited by stop disposed in said caliper for a pad carrier of said other of said two brake shoes.

5. A brake according to claim 2, wherein said second piston has an axial length only slightly longer than the sum of said predetermined clearances plus the axial thicknness of said sealing ring of said second mechanism.

6. A brake according to claim 2, wherein said sealing ring of said second mechanism engages grooves disposed opposite one another in the periphery of said second piston and said cylindrical bore, said groove of said cylindrical bore having a larger axial width than said sealing ring of said second mechanism, said sealing ring of said second mechanism abutting the bottom of both grooves in a radially biased manner.

7. A brake according to claim 1, wherein said stop is a circlip disposed in said caliper.

8. A brake according to claim 1, wherein said second mechanism includes a pair of spaced springs each bearing against said caliper and acting upon said other of said two brake shoes in a brake-release direction.

9. A brake according to claim 1, wherein said second mechanism includes a cup spring disposed between said movable means and a stop disposed in said caliper to limit the axial movement of said movable means toward said disc, said cup spring being biased upon actuation of said movable means.

10. A brake according to claim 1, wherein said movable means includes an elastically deformable diaphragm.

11. A brake according to claim 1, wherein said movable means includes an adjacent surface of a pad carrier plate of said other of said two brake shoes disposed in a cylindrical bore of said caliper and a cup-like diaphragm having a closed end thereof abutting said pad carrier plate and the other end thereof inserted in an annular groove in said bore closing said bore in a hydraulically sealed relationship.

12. A brake according to claim 11, wherein said diaphragm is a rubber-like diaphragm.

13. A brake according to claim 11, wherein said second mechanism includes a pair of spaced springs each bearing against said caliper and said pad carrier plate in a brake-release direction.

14. A brake according to claims 11, 12 or 13, further including
a ring having a collar bearing against said adjacent surface of said pad carrier plate extending therefrom into said bore completely embracing a portion of said diaphragm.

15. A brake according to claim 14, wherein said ring is a sheet-metal ring having an L-shaped cross section.

16. A brake according to claim 15, further including
a heat-insulating element disposed between said diaphragm and said pad carrier plate.

17. A brake according to claim 14, further including
a heat-insulating element disposed between said diaphragm and said pad carrier plate.

18. A brake according to claims 11, 12 or 13, further including
a heat-insulating element disposed between said diaphragm and said pad carrier plate.

* * * * *